United States Patent [19]

Calemard

[11] 4,097,327

[45] Jun. 27, 1978

[54] APPARATUS TO APPLY VIBRATIONS TO PARTIALLY OR COMPLETELY THERMOFUSIBLE ARTICLES

[75] Inventor: Philipe Calemard, L'Etrat-Loire, France

[73] Assignee: Station Service-Textile F. Calemard et Cie S.A., Saint-Etienne, France

[21] Appl. No.: 664,415

[22] Filed: Mar. 5, 1976

[30] Foreign Application Priority Data

Mar. 13, 1975 France .................................. 75 08478

[51] Int. Cl.² .................... B29C 27/08; B32B 31/00
[52] U.S. Cl. .................................. 156/515; 156/580.2
[58] Field of Search ............... 156/73.1, 73.3, 515, 156/580.1, 580.2

[56] References Cited

U.S. PATENT DOCUMENTS

| | | | |
|---|---|---|---|
| 2,633,894 | 4/1953 | Carwile | 156/73.1 |
| 3,308,003 | 3/1967 | Deans | 156/580.2 |
| 3,365,349 | 1/1968 | Daniels et al. | 156/580.2 |
| 3,378,429 | 4/1968 | Obeda | 156/580.2 |
| 3,419,447 | 12/1968 | Hewitt | 156/73.3 |
| 3,439,392 | 4/1969 | McNab | 156/580.1 |
| 3,445,307 | 5/1969 | Balamuth et al. | 156/580.1 |
| 3,459,610 | 8/1969 | Oijkers et al. | 156/73.1 |
| 3,657,033 | 4/1972 | Sager | 156/73.3 |
| 3,666,599 | 5/1972 | Obeda | 156/580.1 |

*Primary Examiner*—Douglas J. Drummond
*Attorney, Agent, or Firm*—Haseltine, Lake & Waters

[57] ABSTRACT

An apparatus to apply vibrations to partially or completely thermofusible articles, the apparatus including a vibrating working tool to cause a localized heating effect between it and a co-acting tool, partially or completely thermofusible articles positioned between the tool being, for example, cut or welded by the heat produced.

17 Claims, 20 Drawing Figures

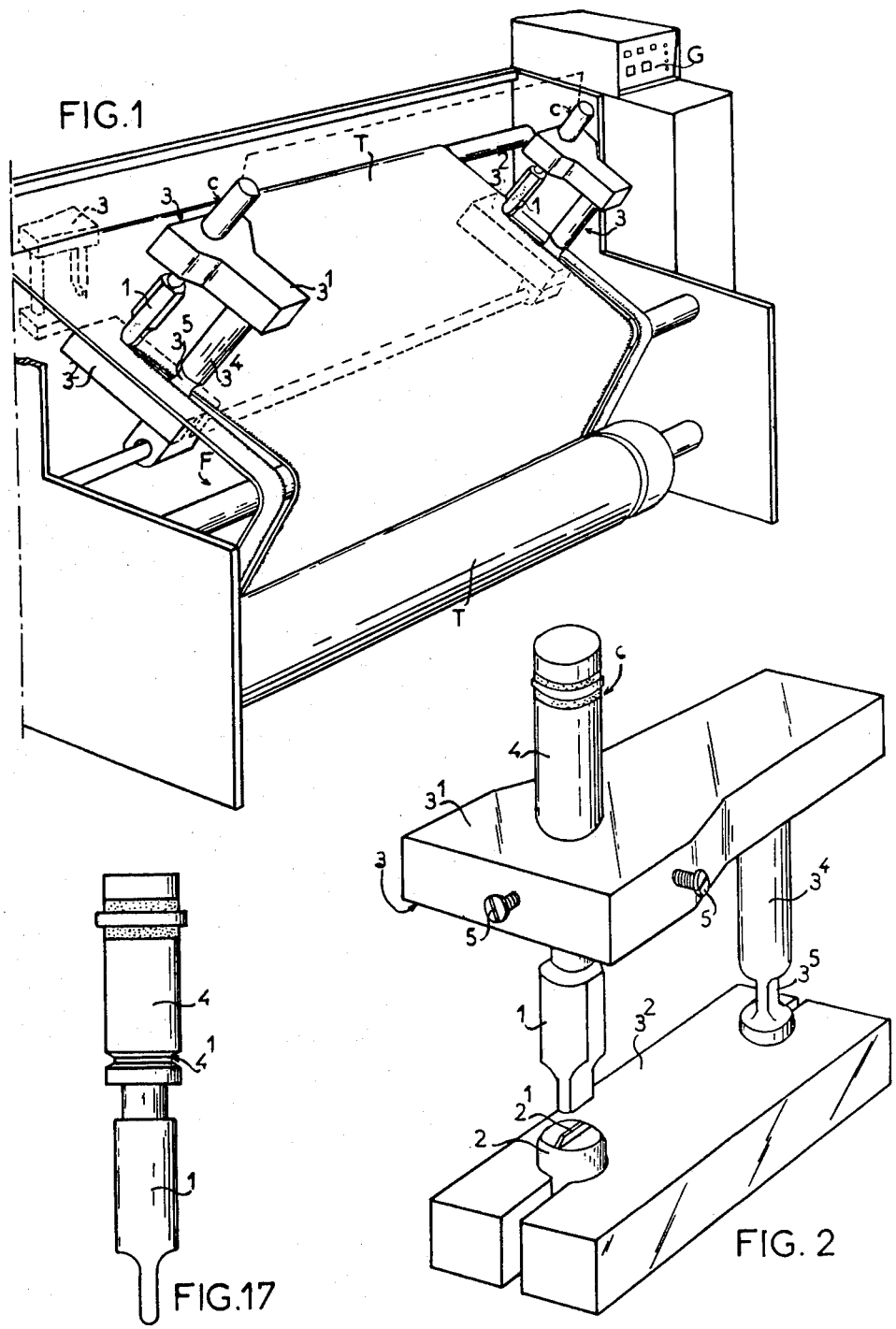

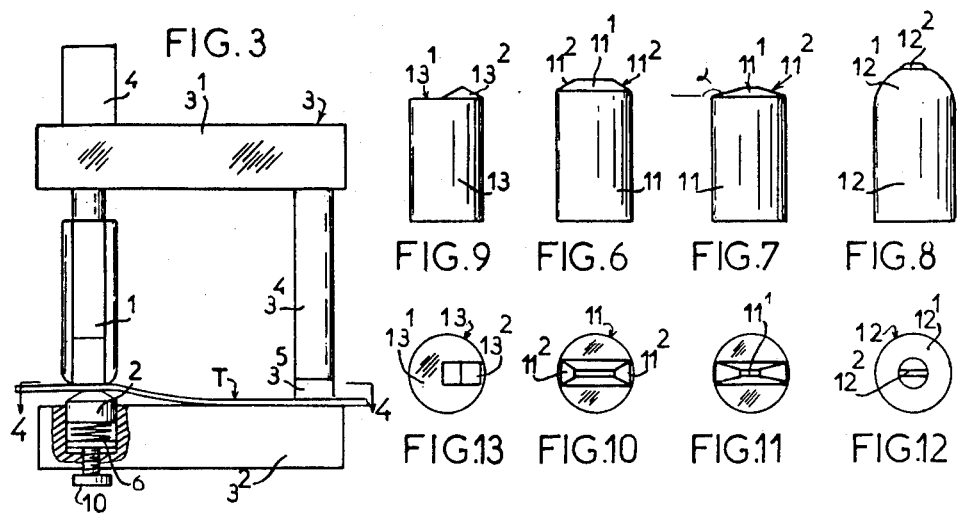
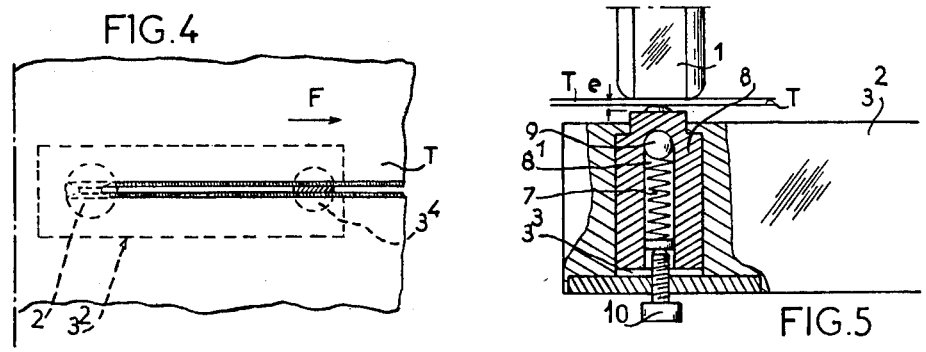
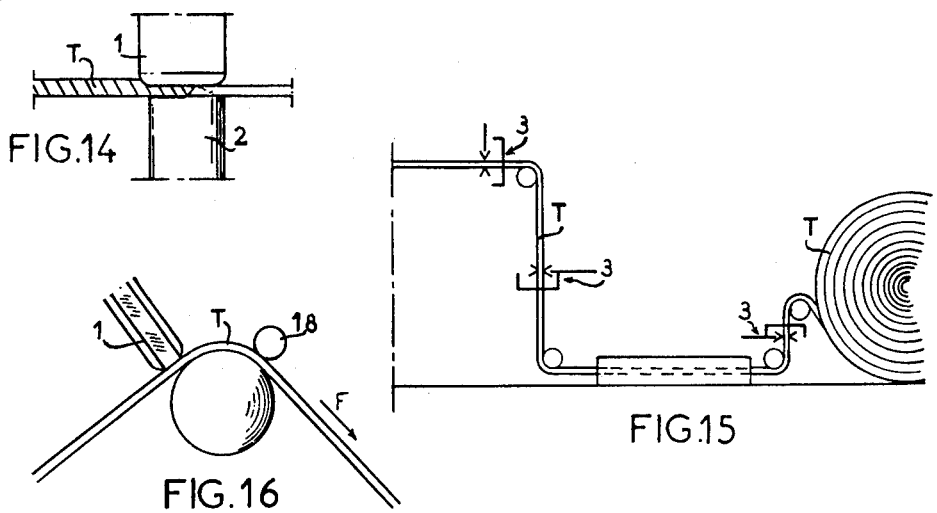

APPARATUS TO APPLY VIBRATIONS TO PARTIALLY OR COMPLETELY THERMOFUSIBLE ARTICLES

This invention relates to apparatus for applying vibrations to partially or completely thermofusible articles.

According to the present invention, there is provided apparatus to apply vibrations to partially or completely thermofusible articles, the apparatus including an electro-acoustic transducer having a sonotrode as a working tool, and a co-acting tool facing the sonotrode, between which tools the articles are subjected to the vibration of the sonotrode in the use of the apparatus.

It is an object of the invention to provide an apparatus which can apply ultrasonic effects to operations such as cutting or welding carried out particularly on textile articles or articles in sheet form and partially or completely thermofusible.

Figure 18:
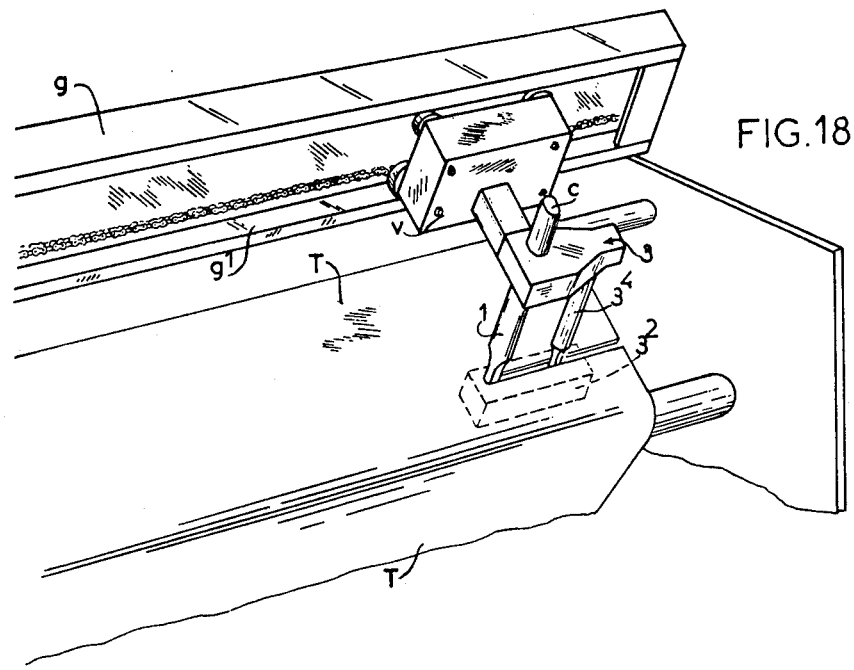
Figures 19, 20:
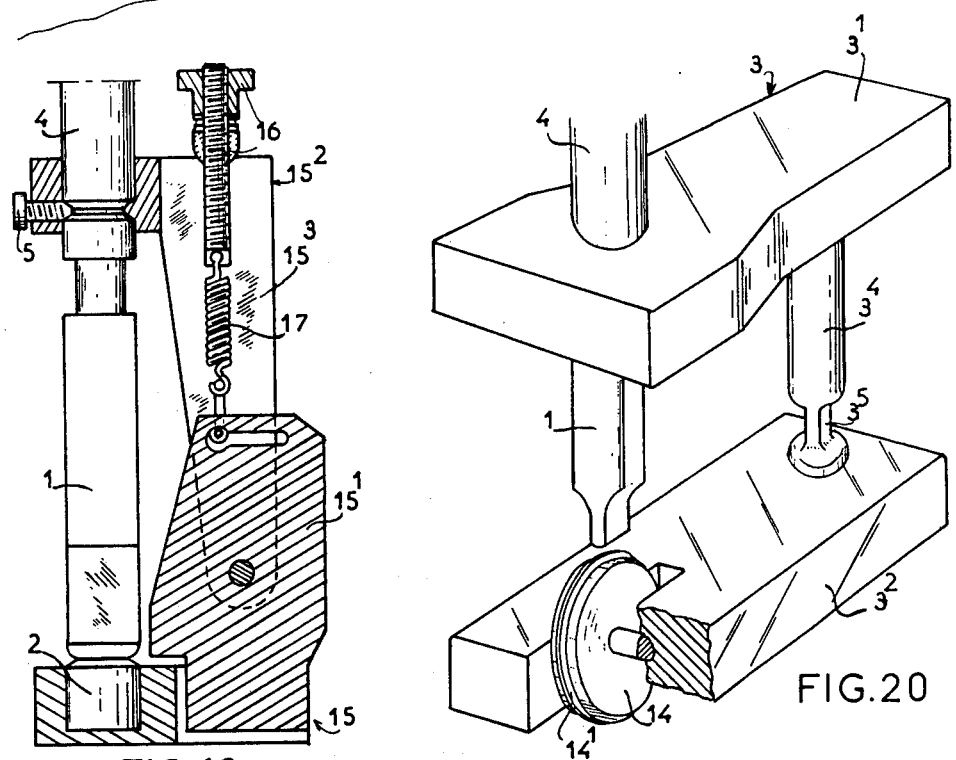

For a better understanding of the invention and to show how the same may be carried into effect, reference will now be made, by way of example, to the accompanying drawings, in which:

FIG. 1 is a diagrammatic perspective view of a machine for treatment of thermofusible or partially thermofusible articles, FIG. 2 is a perspective view to a large scale of part of the machine shown in FIG. 1 and including a working tool in the form of a sonotrode and a co-acting tool, FIG. 3 is a side view, partly in section of part similar to that shown in FIG. 2 and showing a way of mounting the co-acting tool, FIG. 4 is a sectional view taken on the line 4—4 of FIG. 3, FIG. 5 is a part sectional side view of another form of co-acting tool and having another form of mounting, FIGS. 6 to 9 and 10 to 13 are respectively elevations and plan views which correspond in pairs, showing various forms of co-acting tool, FIG. 14 is a diagrammatic view illustrating treatment of an article, FIG. 15 is a schematic view showing various possible positions of the sonotrode and co-acting tool on a machine, FIG. 16 is a schematic view illustrating a way of cutting textile lengths or selvedges, FIG. 17 is a front view of a transducer with its sonotrode, FIG. 18 is a diagrammatic perspective view of part of a machine similar to that shown in FIG. 1 and showing how a transverse cut can be made, FIG. 19 is a cross-sectional view illustrating one way of resiliently mounting the sonotrode, and FIG. 20 is a pespective view showing a modified form of co-acting tool.

An ultrasonic generator transforms electrical energy into mechanical energy to obtain high-frequency vibrations.

An ultrasonic generator generally includes a low-frequency current generator, the power of which can be regulated and which comprises an automatic control device for the frequency of mechanical resonance of an electro-acoustic converter. This generator is shown diagrammatically at G on the machine of FIG. 1.

The electro-acoustic converter is represented by C and includes an electro-acoustic transducer 4 which, by means including a quartz plate positioned between two steel plates, transforms electrical vibrations into mechanical vibrations having an amplitude of a few microns, too small to be directly utilized by the tool. These vibrations are transmitted to an amplifier, which amplifies and transmits the vibrations of the transducer to the working tool, which in the present case is a sonotrode 1.

In the machine shown, which may be a loom or a cutting machine, for example, facing and in alignment with the sonotrode 1 there is mounted a co-acting tool such as an anvil 2, which is fixed on an aperiodic support 3 fitted on the main body of the machine in order to reach a position of equilibrium without any oscillation.

The support 3 is preferably in the form of a swan-neck, one arm $3^1$ of which has an aperture in which the transducer 4 is fixedly mounted, for example, by a screw 5 engaging in a circular groove $4^1$ formed on the periphery of the transducer 4 (FIG. 2).

A lower arm $3^2$ of the support 3 has a seating $3^3$ which is circular or of some other form, in which the anvil 2 is fitted in a fixed or resilient manner, the anvil having a shape complementary to that of the seating $3^3$. These two arms $3^1$ and $3^2$ are connected together remote from the transducer 4 and seating $3^3$, respectively, by an arm $3^4$ which can be integral with the arms $3^1$ and $3^2$ or can be a separate member connecting these two arms.

As shown more particularly in FIGS. 3 and 5, the anvil 2 or 8 is resiliently supported in the seating $3^3$ by a spring 6 or some other resilient means. The spring 6 or resilient means may be directly mounted in the seating $3^3$ of the support 3, the lower face of the anvil 2 (FIG. 3) bearing against the spring 6.

In the embodiment shown in FIG. 5, a spring 7 is fitted in a recess $8^1$ which is formed in the body of the anvil 8. In this case, in order to ensure a better bearing action, a ball 9 is positioned between the spring 7 and the bottom of the seating $8^1$.

To regulate the height of the anvil 2 or 8, the pressure of the spring 6 or 7 can be adjusted by any suitable means, for example, a screw 10.

The anvil 2 (FIG. 3) is thus resiliently urged in a direction out of its seating and towards the sonotrode 1 and an abutment $2^1$ of the anvil 2 presses against the sonotrode 1 and thereby forms a counterbearing impact surface.

The anvil 8 (FIG. 5) can also have a projection similar to the abutment $2^1$ but in this case, a shoulder formed in the upper part of the bore of the seating $3^3$ limits travel of the anvil 8 so as to permit a slight gap e between the anvil 8 and the sonotrode 1.

As is to be described, use is made of the resilience of the anvil to maintain a substantially constant pressure or gap at the sonotrode. Woven or unwoven textile articles or articles in sheet form T, which are partially or completely thermofusible, are positioned between the working tool (the sonotrode 1), which vibrates at ultrasonic frequencies of the order of 20,000 to 30,000 c/s, and the working tool in the form of anvil 2 or 8, which is considered as being fixed relatively to the sonotrode 1.

The vibrational displacement of the sonotrode 1 is preferably perpendicular to the surfaces of the articles to be treated. The vibratory energy which is generated by the sonotrode 1 is applied by contact to the article T. Where a textile article is concerned, the fibres of the article receive between them a relative movement of high frequency which produces a very localized heating of the textile in its thickness and without external dispersion.

By utilizing these effects and by controlling the energy level of the sonotrode 1, various operations can be achieved, for example, welding, cutting, marking, producing decorative effects etc. on the articles.

The fusion can be controlled to enable the material to maintain its continuity so as to obtain a welding effect. Cutting and melting of the edges or selvedges of the articles can occur simultaneously with the present apparatus, this tending to prevent any fraying. As illustrated in FIG. 15, the co-operation of the sonotrode 1 and the anvil 2 produces fusion in the selvedge and consequently a thinning or rolling of the edges, which tends to eliminate excess thickness at the extreme edge.

The various anvils can be easily interchanged and can have a circular section (as shown in the Figures) or a polygonal and generally flat section, especially for high powers.

In accordance with the forms of anvil 11 shown in FIGS. 6 and 10, and 7 and 11, each anvil has a projecting ridge $11^1$ with two transversely sloped faces $11^2$ which each form an angle of inclination $\alpha$ which is variable according to circumstances, this angle $\alpha$ advantageously being as obtuse as possible, consideration including the results which are desired at the time of cutting, the rolling of the article T, the thickness and the composition of the fabric or article.

The form of anvil 12 shown in FIGS. 8 and 12 has a spherical cap $12^1$ which has a straight edge $12^2$.

The form of anvil 13 shown in FIGS. 9 and 13 has a flat zone $13^1$ and an edge zone $13^2$, the flat zone $13^1$ of the anvil 13 permitting a rolling action by thinning the edges of the article T and the edge zone $13^2$ promotes cutting, or instead, a cutting tool of any suitable type to carry out cutting in the cold state, can be mounted close to the sonotrode 1.

In the form shown in FIG. 20, the anvil is replaced by a circular and rotary co-acting tool 14, having a single peripheral edge $14^1$. The tool 14 is mounted for rotation in the lower arm $3^2$ of the support 3. The tool 14 is able to turn freely under the action in travel of the article T or is able to be positively rotated, either by the machine, or independently by a motor, for example. Thus, an even distribution of wear around the edge $14^1$ is produced by rotation of the tool 14.

The textile articles or textile sheets can be thinned or rolled and cut or worked in some other way, either by the displacement of the article between the sonotrode 1 and the co-acting tool (longitudinal cutting), as illustrated in FIG. 1, or by displacement of the sonotrode 1 and the co-acting tool relatively to the article, which is immobilized or stopped during the operation (transverse cutting).

Illustrated in FIGS. 1, 3 and 4 is an aperiodic support 3 in the direction F of winding or travel of the article T, so that the arm $3^4$ is in the cutting line. In order to facilitate the passage of the cut edges, the base of the arm $3^4$ has a reduced section at $3^5$.

The aperiodic support 3 can be fitted instead as shown in broken lines in FIG. 1, depending on whether it is desired to carry out cutting or other operations along or close to the longitudinal edges of the article T, the support 3 being disposed transversely in relation to the direction of movement of the article. As a result, the arm $3^4$ is outside the plane of the article.

The fitting of the support 3 on the machine, where a transverse cutting operation is required, is illustrated in FIG. 18, the support 3 being able to move across the machine by being fitted on, for example, a carriage V.

The carriage V is driven at an angle, for example, by a chain, and is slidably displacable on two parallel slides $g$ and $g^1$. In this case, the support 3 is disposed transversely relatively to the direction of movement of the article T, so that the arm $3^4$ of the support 3 is in the line of cut.

With the commencement of the operation, a pre-regulated pressure is exerted on either side of the article between the sonotrode 1 and the co-acting tool or there is a certain gap, in accordance with the arrangements as described. Because of the heating due to operation, this pressure tends to increase or the gap tends to decrease. This is compensated by the resilience of the co-acting tool, as a result of the pressure or initial gap being regulated at the start, for example, by a screw 10.

As shown in FIG. 19, when the co-acting tool or anvil 2 is non-resiliently mounted in the support 15 (corresponding to the support 3 described earlier), provision is made for the upper arm $15^2$ with which the transducer 4 is fast, to be resiliently movable relative to the co-acting tool instead. Thus, a pressure can be applied to the sonotrode so as to urge it towards and bear on the co-acting tool at substantially constant pressure.

As shown, the base $15^1$ of the arm of the support extending substantially parallel to the sonotrode is formed as a bearing in which is mounted a second bearing $15^3$ for free pivotal movement, which is fast with the upper arm $15^2$ from which the sonotrode 1 depends. By providing a spring 17 and a spring tension adjusting screw 16, oscillation, during use of the machine, of the upper arm $15^2$ can be produced to regulate the frequency of the sonotrode 1.

I claim:

1. Ultrasonic apparatus for operation on material which is at least partially thermofusible, said apparatus comprising ultrasonic generator means including a low frequency generator, an electroacoustic transducer coupled to said generator, a sonotrode coupled to said transducer and constituting a working tool, a counter tool having an upper surface facing said sonotrode, such that the material to be operated on can be transported between the sonotrode and the counter tool, and support means for said transducer, sonotrode and counter tool, said support means comprising an aperiodic support member, said counter tool comprising a base and a projection on said base having an edge of substantially reduced width in relation to said base to constitute a counter bearing impact surface for said working tool permitting simultaneous cutting of the material and fusion of the resulting selvedges at the cut edges, said support member having a recess with a shape corresponding to the base of said counter tool, said base being slidably and demountably mounted in said recess in alignment with said sonotrode, said support member including a lower portion having said recess and an upper portion carrying said sonotrode and to which said transducer is secured.

2. Apparatus as claimed in claim 1 wherein said projection has two transversely inclined surfaces forming an obtuse angle of inclination with respect to a plane passing through the tip of the counter tool.

3. Apparatus as claimed in claim 1 wherein said support member includes a connecting member joining said upper and lower portions together remote from said sonotrode, said connecting member having a reduced section proximate said lower portion.

4. Apparatus as claimed in claim 1 wherein said upper surface of said counter tool is spherical.

5. Apparatus as claimed in claim 1 wherein said upper surface includes a flat compression zone and said projection is in an edge zone.

6. Apparatus as claimed in claim 1 wherein said counter bearing tool is cylindrical.

7. Apparatus as claimed in claim 1 comprising means mounting said support member transversely with respect to the direction of travel of the material such that said connecting member is outside the plane of the material.

8. Apparatus as claimed in claim 1 wherein said support member is fixed and said material travels between the sonotrode and counter bearing tool.

9. Apparatus as claimed in claim 1 comprising means mounting said support member for movement relative to said material to produce cutting of the material and fusion of the selvedges at the cut edges while said material is stationary.

10. Apparatus as claimed in claim 1 wherein the sonotrode has a smooth rounded surface facing said counter tool.

11. Apparatus as claimed in claim 10 wherein said rounded surface has a circular shape in transverse section.

12. Apparatus as claimed in claim 1 wherein said upper surface of the counter tool is of narrow extent to form a cutting surface which cooperates with said sonotrode to effect cold cutting of the material along a median axis of a laminated portion obtained by the cooperation of said sonotrode with a different portion of said counter tool without said cutting surface.

13. Apparatus as claimed in claim 1 wherein said counter tool includes a flat portion for cooperating with said sonotrode to form a laminated portion in said material and means defining a cutting tool mounted in proximity with said sonotrode for cold cutting the material along the median axis of said laminated portion.

14. Apparatus as claimed in claim 1 comprising means removably mounting said counter tool in said lower portion resiliently along the axis of said sonotrode.

15. Apparatus as claimed in claim 9 comprising adjustment means for regulating the degree of resilient mounting of said counter bearing tool.

16. Apparatus as claimed in claim 15 wherein said means resiliently mounting the counter bearing tool comprises a spring acting on said tool.

17. Apparatus as claimed in claim 3 comprising means mounting said support member such that said sonotrode and connecting member are aligned in the direction of travel of the material such that said reduced section is on the line of cut in the material.

* * * * *